J. E. Burrows,
Manf. White Zinc.
No. 108,965. Patented Nov. 8, 1870.
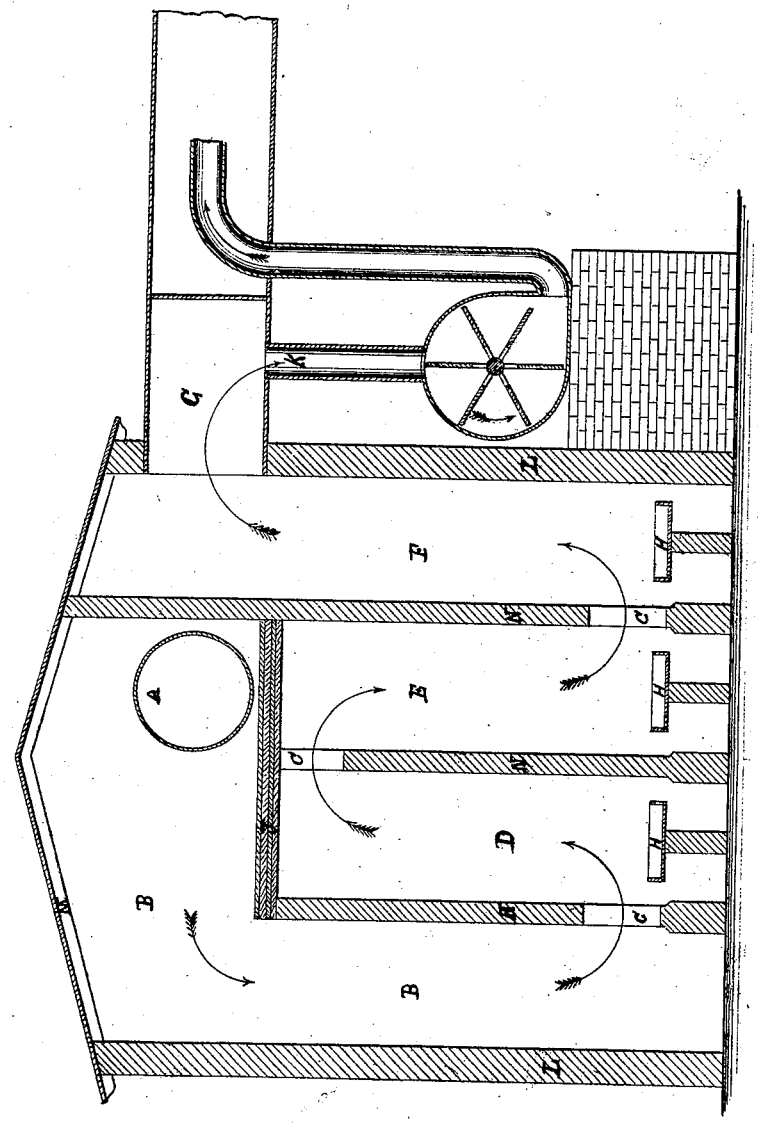

UNITED STATES PATENT OFFICE.

JOHN E. BURROWS, OF NEWARK, NEW JERSEY.

IMPROVEMENT IN APPARATUS FOR COOLING THE VAPORS OF OXIDE OF ZINC.

Specification forming part of Letters Patent No. 108,965, dated November 8, 1870.

*To all whom it may concern:*

Be it known that I, JOHN E. BURROWS, of Newark, in the county of Essex, in the State of New Jersey, have invented a new and Improved Apparatus for Refining and Cooling the Vapors of Oxide of Zinc; and I do hereby declare that the following is a full and exact description thereof, reference being had to the accompanying drawing.

The object of my invention is to provide a chamber where the vapors of zinc and gases undergo a further combustion and oxidation, and to separate the coal-dust and other foreign substances from the vapors of zinc, and also to present a cooling-surface to the vapors and gases generated by my process in the manufacture of white oxide of zinc already patented, which patent bears date August 14, 1855.

I have found that the vapors of zinc generated in my furnace, as above, contain small particles of metallic zinc, and are capable of being converted readily into oxide of zinc by their own combustion in contact with oxygen in a chamber closely connected with the furnaces; and, further, that the foreign substances which are of greater specific gravity than the oxide of zinc fall to the bottom of this chamber, and that at this point the vapors are in a proper condition to be brought in contact with cooling-surfaces.

There is still a further deposit collected in the adjoining partitions of my apparatus. This deposit impairs the color of the oxide and renders it unmarketable. I have also found that great care should be taken to accomplish this object, and that a spray of water is injurious; but that a reservoir containing water, being placed in a position that the hot vapors will pass over and under the same, generates sufficient steam or moisture to sufficiently cool the gases or vapors passing through a series of partitions.

I am aware that an apparatus has been used for collecting and purifying the vapors of zinc, and that the oxide has been contaminated with impurities, owing to its not being provided with a second combustion-chamber, and not having produced the desired object.

I have found from frequent observation that any foreign substances liable to become mixed with the charge of zinc ore and coal used in my furnaces pass over with the metallic flame in the form of black smoke, are readily consumed in this second combustion-chamber, and that if allowed to pass directly through the ordinary apparatus and to the bags, it will discolor the product.

I have also ascertained that when this second combustion-chamber is used a much larger amount of white oxide of zinc of a superior quality is formed, thereby increasing the quantity and quality of the product.

To enable others skilled to make and use my invention, I will proceed to describe it, reference being had to the accompanying drawing.

For all ordinary purposes I construct an apparatus of brick or iron. I prefer to use brick, when purifying metallic vapors, of about the following dimensions: thirty feet high, twenty-eight feet wide, and fifty feet long, with a roof or covering constructed of sheet-iron.

At distances of about ten feet I construct partitions or mid-feather walls, with a mid-feather wall running the entire fifty feet, dividing the partitions into about fourteen feet each. These partitions are connected by openings at the bottom and top of each alternate partition or mid-feather wall.

The vapors of zinc generated in the furnaces pass up the ascending pipe, and thence to the first partition or main combustion-chamber, thence downward through openings in partition-wall to first cooling-apartment. It then takes an upward course to openings made at top of dividing-walls, and thence downward and upward through openings described, the number of partitions being governed by the quantity of vapor to be purified and cooled.

About two feet from the bottom of first cooling-apartment I construct a vessel of iron or earthenware; but I prefer to use iron, of about the following dimensions: fourteen feet long, eighteen inches wide, and twelve inches deep. These water-pans are placed in the same position in each of the alternate partitions, about three feet from the bottom, and are filled with water.

The top or ceiling of these partitions is constructed of iron, with bricks placed on it, and then a layer of plaster-of-paris to a thickness of about three inches. This is done to prevent the heat from the metallic flame passing through the ceiling, and is therefore of non-conducting material.

Having described the vapors as passing through these partitions, at end of last partition is an opening, to allow the vapors to be exhausted or drawn from them by a fan-blower, and thence driven to the bag-room.

A is the opening to admit the ascending pipe from furnaces and convey vapors to combustion-chamber; B B, combustion-chamber; C C C, openings in partition-walls; D, first cooling-partition; E F G, cooling-partitions; H H H, water-pans; J, non-conducting ceiling; K, opening to exhaust or draw-off; L L L L, outside walls; M, iron roof; N N N N, mid-feather walls or partitions.

What I claim, and desire to secure by Letters Patent, is—

The apparatus for purifying and cooling the vapors of zinc, with combustion-chambers and water-pans, substantially as herein described and set forth.

JOHN E. BURROWS.

Witnesses:
  CHARLES J. EAMES,
  F. W. RICORD.